United States Patent Office 3,377,240
Patented Apr. 9, 1968

3,377,240
NEMATOCIDAL 4-HALOPYRIDINES, THEIR OXIDES AND HYDROHALIDES
Joyce D. Nault, Walnut Creek, Calif., assignor to The Dow Chemical Company, Midland, Mich., a corporation of Delaware
No Drawing. Filed Oct. 27, 1966, Ser. No. 589,860
5 Claims. (Cl. 167—33)

ABSTRACT OF THE DISCLOSURE

Soil-inhabiting nematodes are controlled by treatment with a nematocidal amount of a 4-halopyridine or an oxide or hydrohalide thereof.

The present invention is concerned with the treatment of soil or growth media and is particularly directed to a method and composition for the control of soil-inhabiting nematodes which attack the underground parts of plants.

It is an object of the present invention to provide an improved method for the fumigation and disinfection of soil infested with nematodes. A further object is to provide a novel soil composition. Another object is the provision of a novel composition adapted to be employed in the new method of fumigation. Other objects will become apparent from the following specification and claims.

According to the present invention it has been discovered that soil-inhabiting nematodes which attack the underground portions of plants may be controlled by impregnating soil or growth media with at least one member of the group of 4-halopyridines, their oxides and hydrohalides corresponding to the formulae:

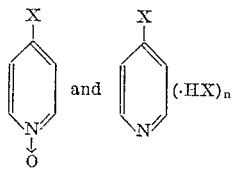

wherein X represents chlorine and bromine and n represents one of the integers 0 or 1. These compounds are liquids or solids and are generally soluble in water and somewhat soluble in common organic solvents such as acetone. Compositions containing one or more of the compounds of the present invention have been found to be very useful in the treatment of soil and other growth media. It is among the advantages of the present invention that the active compounds permeate the media for a distance of several inches from the point of application depending upon the temperature, moisture content, compactness and physical consistency of the media. It is a further advantage that the compounds are sufficiently persistent to accomplish the desired results, but dissipate in a reasonably short period of time.

The distribution of a nematocidal does of one or more of the 4-halopyridine compounds is essential for the practice of the present invention. In general, good results are obtained when one or more of the compounds of the present invention is distributed through the soil in the amount of from 2 to 2,000 parts or more by weight per million parts by weight of soil. In field applications, the active compounds may be distributed in the soil at a dosage of from about one-half to 500 pounds or more per acre, and through such a cross section of the soil as to provide for the presence therein of a nematocidal concentration of toxicant. In such applications, it is desirable that the toxicant be distributed to a depth of at least 12 inches below the soil surface. In the method of the present invention, nematocidal concentrations of the toxicant compound can be applied to the nematode infested soil by such convenient procedures as injection, drenching with an aqueous dispersion, application as a dust or other techniques known to the skilled artisan.

In carrying out the method of the present invention the soil dwelling nematodes may be controlled by distributing in the soil or other growth media the unmodified 4-halopyridine compound. However, the present method also embraces the employment of a liquid or dust composition containing the compounds. In such usage, the 4-halopyridine compound may be modified with one or more of a plurality of additaments including solvents or other liquid carriers, surface active dispersing agents and finely divided inert solids. Depending on the concentration of the 4-halopyridine compounds employed, such augmented compositions are adapted to be distributed in the soil, or employed as concentrates and subsequently diluted with additional inert carrier to produce the ultimate treating compositions.

The exact concentration of 4-halopyridine compounds to be employed in compositions for the treatment of growth media may vary provided a nematocidal dosage of effective agent is supplied. The concentration of toxicant in liquid compositions employed to supply the desired dosage generally is from about 0.01 to 50 percent by weight although as high a concentration as 90 percent by weight may be employed. In dusts, the effective weight may be from about 1 to 20 percent by weight. In compositions to be employed as concentrates, the 4-halopyridine materials may be present in a concentration of from about 5 to 95 percent by weight.

Liquid compositions containing the desired amount of active ingredient may be prepared by dispersing the toxicants in water or an organic liquid with the aid of a suitable surface-active dispersing agent such as an ionic or non-ionic emulsifying agent. The surface-active dispersing agents are generally employed in the amount of from 1 to 20 percent by weight of the combined weight of the compound and surface-active agent in the composition. Suitable organic liquid carriers include acetone, xylene, toluene, isopropanol, polyglycols, chlorinated hydrocarbons such as methylene chloride, carbon tetrachloride, chlorobenzene and the petroleum distillates such as diesel fuel, kerosene, fuel oil, naphthas, and Stoddard solvent. Among the latter, the petroleum distillates boiling almost entirely under 400° F. at atmospheric pressure and having a flash point above 80° F. are generally preferred, however, any suitable liquid carrier or combination of carriers can be employed. The aqueous compositions may contain a small amount of a water-immiscible solvent whereby, the carrier comprises an aqueous emulsion, namely, a mixture of water, emulsifying agent and organic liquid. In the liquid compositions, the choice of dispersing and emulsifying agent and the amount thereof employed are dictated by the nature of the composition and by the ability of the agent to facilitate the dispersion of the toxicant compound in the carrier to produce the desired composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the active ingredient is dispersed in and on a finely divided inert solid such as clay, talc, chalk, gypsum and the like. In such operations, the finely divided carrier is mechanically mixed or ground with the 4-halopyridine. Similarly, dust compositions containing the toxicant compounds may be prepared from various solid surface-active dispersing agents such as bentonite, fuller's earth, attapulgite and other clays. Depending upon the proportions of ingredients, these dust compositions may be employed as concentrates and subsequently diluted with additional solid surface-active dispersing agent or with chalk, talc, diatomaceous earth or gypsum and the like to obtain the desired amount of active ingredient in a composition adapted to be employed for the treatment of soil. Also, such dust compositions may be dispersed in water with or without the aid of a dispersing agent to form spray mixtures.

When operating in accordance with the present invention, the 4-halopyridine compound is dispersed in soil or growth media in any convenient fashion, e.g., by simply mixing with the soil, by applying to the surface of the soil and thereafter dragging or disking into the soil to the desired depth, by employing a liquid carrier to accomplish the penetration and impregnation or by injection or drilling techniques whereby the toxicant is deposited beneath the surface of the soil.

In a further method, the distribution of the 4-halopyridine compound in soil may be accomplished by introducing the toxicants in the water employed to irrigate the soil. In such procedures, the amount of water may be varied with the porosity and water-holding capacity of the soil to obtain the desired depth of distribution of the toxicants.

The following examples illustrate the invention but are not to be construed as limiting:

Example 1

4-bromopyridine is dissolved in acetone to produce a fumigant composition containing 500 grams of the 4-halopyridine compound per liter of the ultimate mixture. This composition is employed for the treatment of a seed bed containing a sandy loam soil which is heavily infested with root knot nematodes. At the time of treatment the soil has a moisture content of about 10 percent. The distribution is accomplished by injecting the fumigant solution into the soil in rows 12 inches apart, the injections being made at 4 inch intervals and at a depth of about 6 inches below the soil surface. The amount of fumigant material employed is sufficient to supply 5 pounds of 4-bromopyridine per acre foot. Following the application, the average soil temperature remained at about 62° F. for the period of the determination.

Ten days after treatment, the soil is seeded with tomato plants, the seeded soil being that positioned approximately 6 inches from the loci of treatment. Untreated check plots in the same nematode-infested area are also planted with tomato seeds. During the growing period, there is observed no adverse effect upon the germination and growth of seedlings attributable to nematode attack. The examination of the plants indicated a 100 percent control of nematodes in the treated soil, with heavy infestation in the check plots.

Example 2

4-chloropyridine-1-oxide and 4-chloropyridine are each employed as the sole toxicant in compositions employed for the treatment of a seed bed containing a sandy loam soil which is heavily infested with root knot nematodes. The distribution is accomplished by injecting the 4-halopyridine compound into the soil in the manner as described in Example 1. The treatment is carried out at a substantially uniform dosage of 10 pounds per acre foot. Following the application, the average soil temperature remains at about 62° F. for the period of the determination.

Fourteen days after treatment, the soil is seeded with tomato plants, the seeded soil being that positioned approximately six inches from the loci of treatment. Untreated checks are also planted with tomato seeds. During the growing period, there is observed no adverse effect upon the germination and growth of seedlings attributable to the presence of residual fumigant. About six weeks after seeding, the plants are lifted from the soil, the roots washed and the latter examined for gall formation attributable to nematode attack. The examination shows a commercial control of nematodes in the treated soil with the roots of the plants from the untreated soil being dwarfed and severely affected with galls attributable to nematode attack.

Example 3

An acetone solution containing 5.0 grams of one of the 4-halopyridines per liter of solution was employed for the treatment of a sandy loam soil which was heavily infested with root knot nematodes. In such operations, the soil was placed in a sealable container and thereafter treated with the fumigant composition at a dosage of 10 pounds per acre-foot. The containers of treated soil were then sealed and set aside in a 70° F. constant temperature room for about one week.

Following the latter period, the containers were unsealed, allowed to aerate for seven days and the soil thereafter planted with cucumber seeds. Untreated check soil was also planted with cucumber seeds. During the following growth period there was observed no adverse effect upon germination and growth of seedlings attributable to the presence of residual fumigation. About 3 weeks after planting, the plants were lifted from the soil, and the roots washed and examined for evidence of nematodes attack. The examination of the plants indicated that 4-bromopyridine hydrobromide, 4-bromopyridine hydrochloride, 4-chloropyridine-1-oxide, 4-bromopyridine and 4-chyoropyridine each gave 100 percent control of nematodes when employed as the sole toxicant compound. The roots of the plants grown in the untreated check soil showed dwarfing and heavy galling due to the attack of root knot nematodes.

Example 4

4-chloropyridine is dissolved in a petroleum hydrocarbon fraction boiling at from about 240° F. to 365° F. (Standard Thinner No. 300) to produce a fumigant composition containing about 500 grams of the 4-chloropyridine compound per liter of ultimate mixture. This composition is employed for the treatment of a sandy loam soil heavily infested with root knot nematodes. In the treating operations, the mixture is injected into the soil in an amount sufficient to provide the toxicant at dosages of 5 pounds per acre foot of infected soil. At the time of treatment the soil has a moisture content of about 10 percent. Following the distribution, the average soil temperature is maintained at about 68° F. for the period of the determination.

About two weeks after treatment, two week old tomato plants grown on nematode-free soil are transplanted to the treated soil areas. Untreated checks are also planted with the two week old plants. About six weeks after the transplanting, the plants are carefully lifted from the soil, the roots washed and the latter examined for gall formation attributable to nematode attack. The examination shows a 100 percent control of nematodes in the soil treated with 4-chloropyridine. In contrast, the roots of the plants from the check beds are severely affected with galls attributable to nematode attack.

Example 5

Aqueous compositions containing a 4-halopyridine as the sole toxicant were prepared and employed as drenches to treat sandy loam soil infested with root knot nematodes. In such operations, the 4-halopyridine compound was dissolved in acetone which was injected into the water to produce an aqueous solution containing 25 parts of toxicant per million parts of ultimate mixture. This aqueous solution was added to containers of sandy loam soil in an amount sufficient to wet the soil completely and give a dosage of approximately 2.6 lbs./acre. Thereafter the treated soil was allowed to stand open to the air at room temperature for 5 days. Following this period, cucumber seeds were planted in the treated soil. Checks were prepared by planting cucumber seeds in containers of the same nematode infested soil which had not been treated with toxicant material.

The seeded soil plots were maintained in a green house under growth conditions. About 3 weeks after planting the plants were lifted from the soil, and the roots washed and examined for root knot nematode control. Such examination indicated that 4-bromopyridine, 4-chloropyridine and 4-chloropyridine hydrochloride each, when employed as the sole toxicant compound, gave 100 percent kill and control of root knot nematodes when employed at a concentration of 25 parts per million by weight of toxicant per million parts by weight of soil.

Example 6

45 parts by weight of 4-chloropyridine, 80 parts by weight of chlorobenzene and 5 parts of a dimeric alkylated aryl polyether alcohol (Triton X–155) are mechanically mixed together to prepare a fumigant composition in the form of an emulsifiable liquid. In a similar manner, 90 parts by weight of 4-bromopyridine and 10 parts by weight of Triton X–155 are mixed together to prepare a concentrate composition in the form of a water-dispersible liquid. These compositions are adapted to be dispersed in water to prepare aqueous fumigant compositions which have very desirable wetting and penetrating properties. The latter aqueous compositions may be employed to fumigate soil and distribute 4-chloropyridine therein in parasiticidal concentrations.

Example 7

90 parts by weight of 4-chloropyridine is intimately mixed with 12 parts by weight of Triton X–155 and the resulting composition thereafter dispersed in water to prepare a composition containing about 100 pounds of 4-chloropyridine per 200 gallons of ultimate mixture. The latter composition, while under agitation is metered into irrigation water at the pump outlet at the rate of 2 gallons per 1000 U.S. gallons of the irrigation water. The water is in a state of turbulent flow as it comes from the pump which provides for thorough mixing of the toxicant therein. About 3 inches of the irrigation water is applied to land, which is heavily infested with root knot nematodes, to accomplish the wetting of the soil to about an 18 inch depth. A few weeks after the treatment the soil is planted with tomato seeds. Eight weeks after the seeding, the resulting stand of tomato plants is examined and found substantially free of nematode attack.

The expression "soil" is employed herein in its broadest sense to be inclusive of all conventional "soils," as defined in Webster's New International Dictionary, Second Edition, Unabridged, published in 1937, G. C. Merriam Co., Springfield, Mass. Thus the term refers to any substance or medium in which vegetative organisms may take root and grow, and is intended to include not only earth, but also compost, manure, muck, sand and the like, adapted to support plant growth.

I claim:

1. A method for controlling nematodes which comprises applying to said nematodes an effective amount of a 4-halopyridine compound corresponding to the formulae

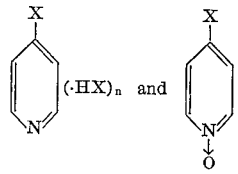

wherein X represents a member of the group consisting of chloro and bromo and $n$ represents one of the integers 0 and 1.

2. The method claimed in claim 1 wherein the 4-halopyridine compound is employed in the amount of at least 5 parts by weight per million parts by weight of soil.

3. The method claimed in claim 1 wherein the 4-halopyridine compound is 4-bromopyridine.

4. The method claimed in claim 1 wherein the 4-halopyridine compound is 4-chloropyridine.

5. The method of claim 1 wherein the nematodes are present in the soil.

References Cited

UNITED STATES PATENTS 3,105,005   9/1963   Cannon et al. _____ 167—13

OTHER REFERENCES

Chemical Abstracts, Fifth Decennial Index, Subjects Po–Rz, volumes 41–50, 1956, p. 10535s.

Chemical Abstracts, Subject Index J–Z, volume 60, 1964, p. 2205S.

ALBERT T. MYERS, *Primary Examiner.*

SAM ROSEN, *Examiner.*

J. D. GOLDBERG, *Assistant Examiner.*

Notice of Adverse Decision in Interference

In Interference No. 96,930 involving Patent No. 3,377,240, J. D. Nault, NEMATOCIDAL 4-HALOPYRIDINES, THEIR OXIDES AND HYDROHALIDES, final judgment adverse to the patentee was rendered June 30, 1971, as to claims 1, 2, 3, 4 and 5.

[*Official Gazette August 10, 1971*]